US011343972B2

(12) United States Patent
Simmons

(10) Patent No.: US 11,343,972 B2
(45) Date of Patent: May 31, 2022

(54) AGRICULTURAL BALER WITH CONTROLLED TAILGATE LOCKOUT

(71) Applicant: CNH Industrial America LLC, New Holland, PA (US)

(72) Inventor: Scott C. Simmons, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 175 days.

(21) Appl. No.: 16/546,848

(22) Filed: Aug. 21, 2019

(65) Prior Publication Data

US 2021/0051854 A1 Feb. 25, 2021

(51) Int. Cl.
*A01F 15/07* (2006.01)
*A01F 15/08* (2006.01)

(52) U.S. Cl.
CPC .......... *A01F 15/07* (2013.01); *A01F 15/0833* (2013.01); *A01F 2015/0785* (2013.01)

(58) Field of Classification Search
CPC ................. A01F 15/07; A01F 15/0833; A01F 2015/0785
USPC ........................................................ 100/88
See application file for complete search history.

(56) References Cited

U.S. PATENT DOCUMENTS

| | | | |
|---|---|---|---|
| 3,099,205 A * | 7/1963 | Lovrinch | B30B 9/3032 100/255 |
| 4,389,930 A | 6/1983 | Rutschilling | |
| 4,674,403 A | 6/1987 | Bryant et al. | |
| 5,025,718 A * | 6/1991 | Viaud | A01F 15/0833 100/87 |
| 5,551,218 A | 9/1996 | Henderson et al. | |
| 5,581,976 A | 12/1996 | Underhill | |
| 5,622,104 A * | 4/1997 | Viesselmann | A01F 15/07 100/88 |
| 5,813,204 A | 9/1998 | Pecenka et al. | |
| 6,272,825 B1 | 8/2001 | Anderson et al. | |
| 6,295,797 B1 | 10/2001 | Naaktgeboren et al. | |

(Continued)

FOREIGN PATENT DOCUMENTS

DE 2712878 A1 9/1978
DE 299 20 188 U1 1/2001

(Continued)

OTHER PUBLICATIONS

Extended European Search Report for EP Application No. 20191794.5 dated Jan. 13, 2021 (six pages).

*Primary Examiner* — Jimmy T Nguyen
(74) *Attorney, Agent, or Firm* — Peter Zacharias; Patrick Sheldrake

(57) ABSTRACT

A tailgate assembly for an agricultural baler includes: a tailgate that is movable between an open position and a closed position; a tailgate actuator coupled to the tailgate and configured to move the tailgate between the open position and the closed position; and a controller. The controller is configured to: determine that a bale formation cycle is beginning; enter a lockout mode responsively to determining the bale formation cycle has begun, the lockout mode preventing the tailgate actuator from moving the tailgate to the open position; determine that the bale formation cycle is complete; and enter an ejection mode from the lockout mode responsively to determining the bale formation cycle has completed, the ejection mode allowing the tailgate actuator to move the tailgate to the open position.

14 Claims, 8 Drawing Sheets

(56) References Cited

U.S. PATENT DOCUMENTS 6,539,851 B1 4/2003 Wilkens et al.
6,644,006 B1 11/2003 Merritt et al.
6,877,304 B1 4/2005 Smith et al.
6,888,092 B2 5/2005 Walters

FOREIGN PATENT DOCUMENTS

EP 2183957 A1 5/2010
EP 2923560 A1 9/2015

* cited by examiner

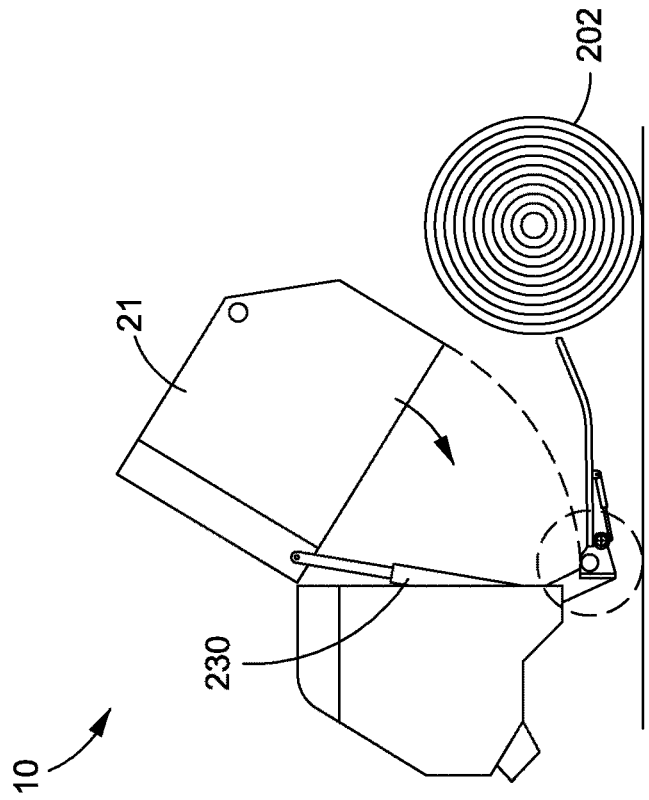
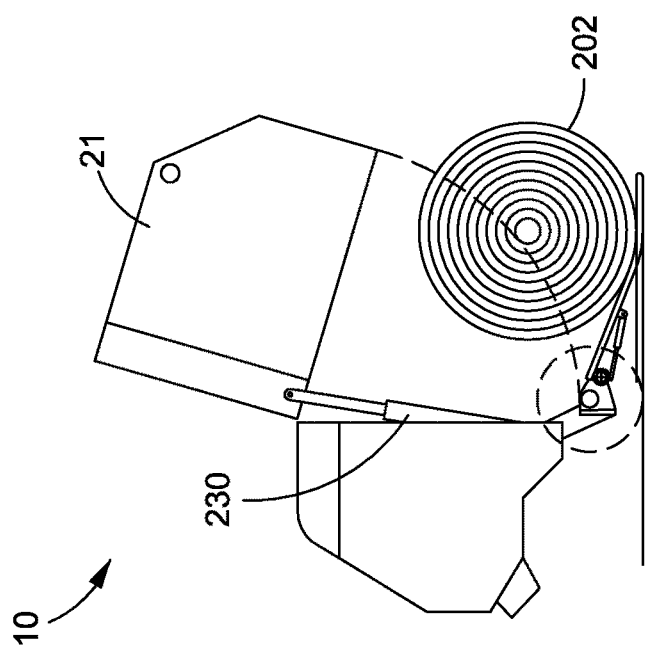

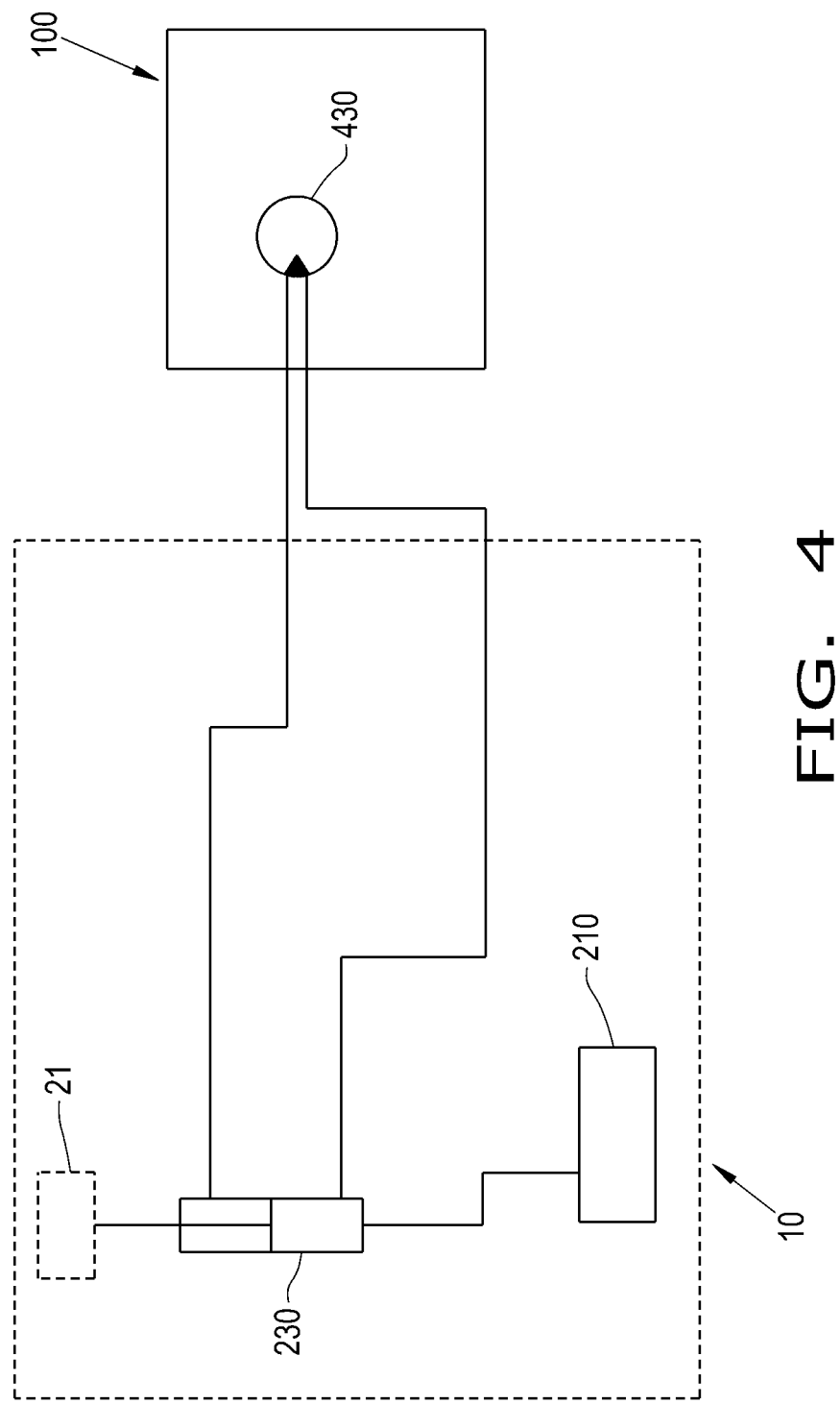

US 11,343,972 B2

AGRICULTURAL BALER WITH CONTROLLED TAILGATE LOCKOUT

FIELD OF THE INVENTION

The present invention pertains to agricultural vehicles and, more specifically, to agricultural balers.

BACKGROUND OF THE INVENTION

For many years harvesters, such as agricultural balers, have been used to consolidate and package crop material to facilitate the storage and handling of the crop material for later use. Usually, a mower-conditioner cuts and conditions the crop material for windrow drying in the sun. When the cut crop material is properly dried, a harvester, such as a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional bale forming chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material. In certain instances, a bale may be ejected that is not fully formed.

What is needed in the art is a baler that can address at least some of the previously described issues with known balers.

SUMMARY OF THE INVENTION

Exemplary embodiments disclosed herein provide a tailgate assembly that includes a controller configured to enter a lockout mode that prevents opening of a tailgate until the controller enters an ejection mode.

In some exemplary embodiments provided according to the present disclosure, a tailgate assembly for an agricultural baler includes: a tailgate that is movable between an open position and a closed position; a tailgate actuator coupled to the tailgate and configured to move the tailgate between the open position and the closed position; and a controller. The controller is configured to: determine that a bale formation cycle is beginning; enter a lockout mode responsively to determining the bale formation cycle has begun, the lockout mode preventing the tailgate actuator from moving the tailgate to the open position; determine that the bale formation cycle is complete; and enter an ejection mode from the lockout mode responsively to determining the bale formation cycle has completed, the ejection mode allowing the tailgate actuator to move the tailgate to the open position.

In some exemplary embodiments provided according to the present disclosure, an agricultural baler includes: a chassis; a bale forming chamber carried by the chassis; and a tailgate assembly associated with the bale forming chamber. The tailgate assembly includes: a tailgate that is movable between an open position and a closed position; a tailgate actuator coupled to the tailgate and configured to move the tailgate between the open position and the closed position; and a controller. The controller is configured to: determine that a bale formation cycle is beginning; enter a lockout mode responsively to determining the bale formation cycle has begun, the lockout mode preventing the tailgate actuator from moving the tailgate to the open position; determine that the bale formation cycle is complete; and enter an ejection mode from the lockout mode responsively to determining the bale formation cycle has completed, the ejection mode allowing the tailgate actuator to move the tailgate to the open position.

In some exemplary embodiments provided according to the present disclosure, a method of controlling a tailgate assembly of an agricultural baler is provided. The method is performed by a controller and includes: receiving a request to open a tailgate while a bale formation cycle is underway in a bale forming chamber of the baler; preventing opening of the tailgate while the bale formation cycle is underway; determining that the bale formation cycle has completed; and allowing opening of the tailgate after determining the bale formation cycle has completed.

One possible advantage that may be realized by exemplary embodiments disclosed herein is that preventing opening of the tailgate during the bale formation cycle prevents a bale from being ejected from the baler until it is fully formed and wrapped.

Another possible advantage that may be realized by exemplary embodiments disclosed herein is that the lockout made can be overridden by an operator after following a procedure that reduces the risk of accidental bale ejection.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 3A illustrates a tailgate of the baler of FIGS. 1-2 ejecting a formed and wrapped bale;

FIG. 3B illustrates the tailgate of FIG. 3A after the tailgate has begun closing and the ejected bale has rolled away from the baler;

FIG. 4 illustrates a schematic of the baler and tractor of FIG. 2 when a controller is in a lockout mode;

DETAILED DESCRIPTION OF THE INVENTION

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
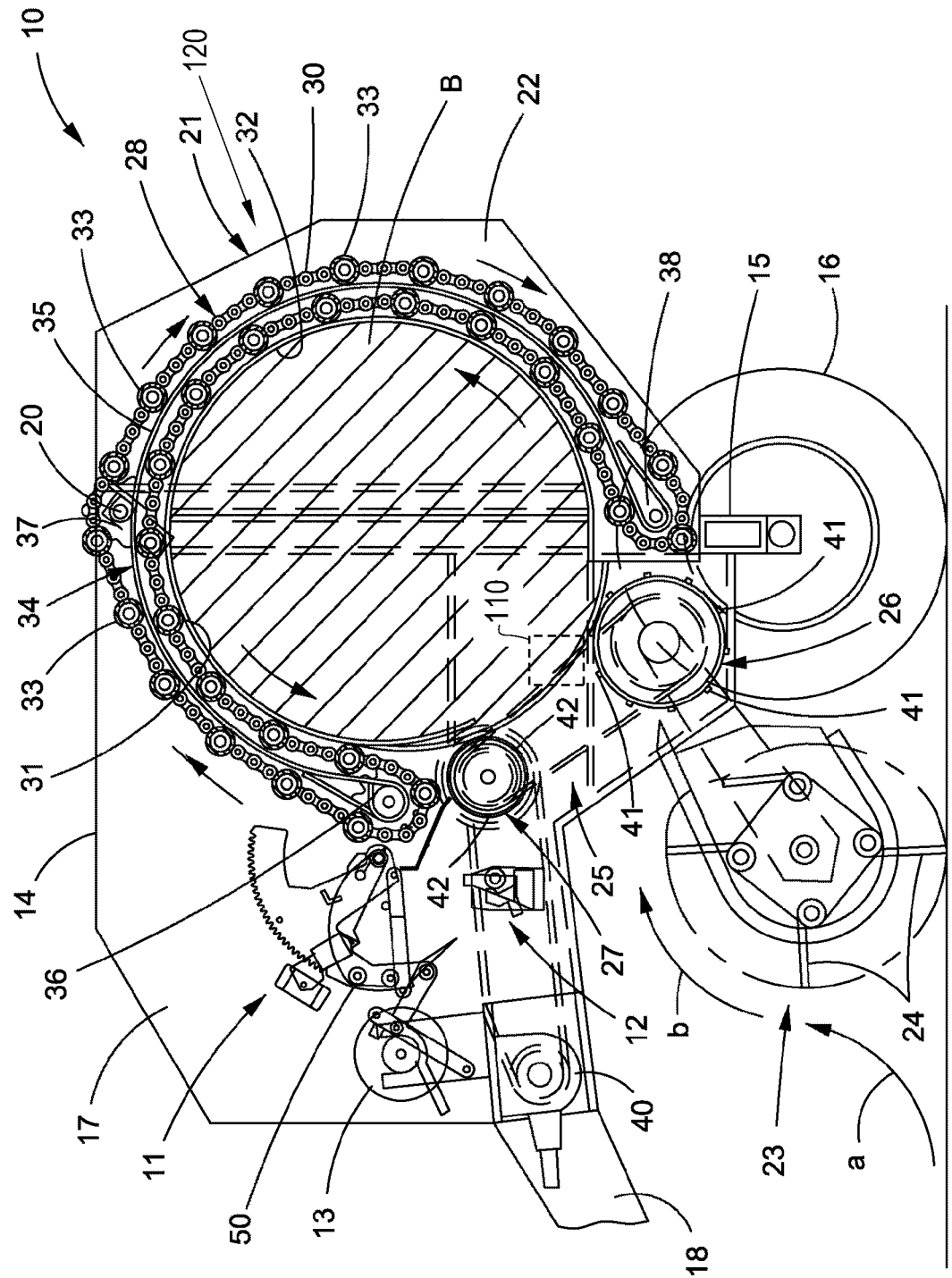
FIG. 1 illustrates a sectional view of an exemplary embodiment of an agricultural baler including a tailgate assembly, provided in accordance with the present disclosure.
Figure 2:
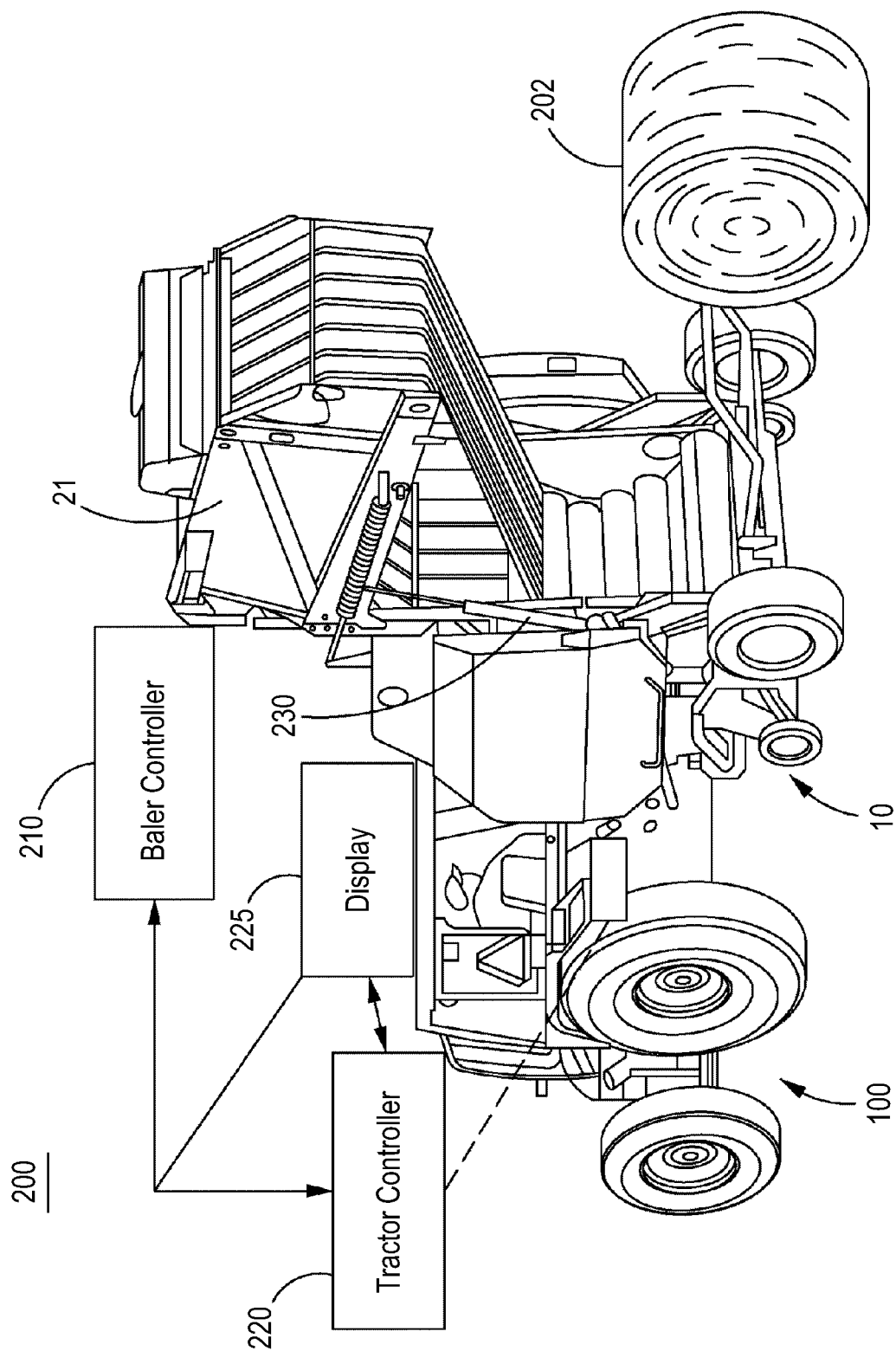
FIG. 2 illustrates a perspective view of a tow vehicle towing the baler of FIG. 1.

FIG. 1 depicts an exemplary agricultural round baler, generally designated 10. As previously noted, crop in the field is usually arranged in a windrow as it is engaged by the baler 10 being pulled along the windrow of cut crop material by a towing vehicle, which may be in the form of a tractor 100 as illustrated in FIG. 2.

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a chassis 14 with a main support beam 15 on which a pair of wheels 16 (only one shown) are rotatably affixed. The chassis includes a pair of side walls between which a cylindrical bale forming chamber extends. For the purposes of clarity only one wall 17 is shown in FIG. 1 and the elements mounted inwardly thereof are shown in full lines for clarity. For illustrative purposes reference letter B is used to designate a bale, shown in cross section in the chamber.

Baler 10 also includes a tongue 18 extending from the forward portion of chassis 14 for conventional connection to a tractor (not shown). Pivotally connected to the sidewalls of chassis 14 by a pair of stub shafts 20 is tailgate 21 which may be closed (as shown in FIG. 1) during bale formation or pivoted open about stub shafts 20 to discharge a completed bale. The tailgate 21 is part of a tailgate assembly 120. The tailgate 21 includes tailgate walls 22 coextensive with side walls 17. A pickup assembly 23 mounted on chassis 14 in a suitable manner includes a plurality of fingers or tines 24 movable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

FIG. 2 illustrates an exemplary embodiment of a baling system 200 provided according to the present disclosure. The baling system 200 includes the baler 10 with a baler controller 210 and the tractor 100 with a tractor controller 220 and a display 225 accessible by an operator in the tractor 100. The display 225 allows for the operator to see various control and status information as well as to enter and configure information for use by the tractor controller 220 and the baler controller 210. The tractor controller 220 and the baler controller 210 are operatively coupled to one another for messaging and data communication, as is known. The display 225 is operatively coupled to the tractor controller 220 and may be operatively coupled to the baler controller 210 directly or indirectly through the tractor controller 220. In some embodiments, the tractor controller 220 and the baler controller 210 are integrated in an ISO-BUS system; in such embodiments, the controllers 210, 220 may communicate on the ISOBUS network. It should thus be appreciated that an ISOBUS network may also be the "controller" referred to herein.

In other embodiments, the baler 10 is not connected to the tractor 100 but is connected to other equipment, such as, for example, a harvester or a part of a harvester, such as a cotton picker, or the like. In these embodiments, the other equipment (e.g., harvester) may include a controller, similar to the tractor controller 220, and an operator interface, similar to the display 225.

As shown in FIG. 2, the tailgate 21 is in an open position with the bale 202 ejected from the baler 10. The bale 202 is fully formed and wrapped prior to ejection. In addition to the baler controller 210 and the components described above with reference to FIG. 1, the tailgate assembly 120 also includes a tailgate actuator 230, illustrated as a hydraulic cylinder, connected to the tailgate 21 to move the tailgate 21 between the closed position and the open position. The baler controller 210 may control a flow of fluid to the tailgate actuator 230; by controlling a hydraulic flow rate of the fluid to the tailgate actuator 230, the baler controller 210 controls opening and closing of the tailgate 21. Alternatively or in addition, the baler controller 210 may control activation of the tailgate actuator 230 to control opening and closing of the tailgate 21.

FIGS. 3A and 3B provide side views of the baler 10 (without the tractor 100 or other equipment connected to the baler 10) with the tailgate 21 in an open position and in a position in which closing of the tailgate 21 has commenced, respectively. The tailgate 21 is illustrated in the closed position in dashed lines. In FIG. 3A, the bale 202 is fully formed and wrapped and the tailgate 21 is in the open position to allow the bale 202 to be ejected. In FIG. 3B, the bale 202 has been ejected and closing of the tailgate 21 has commenced.

In many known baling systems, the operator is able to manually signal for release of the bale from the baler. The signal may be sent, for example, after the operator selects an icon on a display or presses a switch. While this is a convenient way for an operator to signal for a bale to be ejected, this convenience can result in bales being ejected prior to being fully formed and wrapped. For example, the operator may inadvertently press a release switch that signals to release the bale while moving in the cabin. In such a case, the operator may have to unroll the partially formed bale and drive back over the material to produce a fully formed bale. This is inconvenient for the operator and can result in a significant amount of wasted time and effort.

To reduce the risk of a partially formed bale being released from the baler 10, a controller, such as the baler controller 210, the tractor controller 220, and/or the ISOBUS network provided according to the present disclosure is configured to determine that a bale formation cycle is beginning and enter a lockout mode responsively to determining the bale formation cycle has begun. The lockout mode prevents the tailgate actuator 230 from moving the tailgate 21 to the open position. The baler controller 210 is also configured to determine that the bale formation cycle is complete, indicating that the bale is fully formed. The baler controller 210 enters an ejection mode from the lockout mode responsively to determining the bale formation cycle has completed, with the ejection mode allowing the tailgate actuator 230 to move the tailgate 21 to the open position. While the baler controller 210 is described as being configured to enter the lockout mode or ejection mode, preventing or allowing opening of the tailgate 21 respectively, it should be appreciated that a different or additional controller, such as the tractor controller 220, can be configured similarly to achieve the same functionality.

For example, the baler controller 210 may receive bale size signals from one or more operatively coupled bale size sensors 110, illustrated in FIG. 1, that correspond to the size of a bale forming in the bale forming chamber. Based on the received bale size signal(s), the baler controller 210 can determine that a bale is forming in the bale forming chamber and enter the lockout mode. In some embodiments, the baler controller 210 is operatively coupled to the tailgate actuator 230 and configured to prevent outputting an open signal to the tailgate actuator 230, which causes the tailgate actuator 230 to move the tailgate 21 to the open position, when in the lockout mode. This prevention can be implemented in controller software that does not allow outputting of the open signal unless the baler controller 210 is out of the lockout mode, e.g., in the ejection mode. For example, the baler controller 210 may prevent output of the open signal after receiving a tailgate open request signal, which may be output to the baler controller 210 from the display 225 and/or a physical switch and would cause the baler controller 210 to output the open signal to the tailgate actuator 230 when out of the lockout mode. The baler controller 210 can determine that the bale formation cycle is complete, for example, after receiving a signal from the bale size sensor(s) 110 that the bale has reached a predetermined size; in such a case, the signal from the bale size sensor(s) 110 indicating the bale has reached the predetermined size functions as a bale formation cycle complete signal to the baler controller 210. In some embodiments, the baler controller 210 determines that the bale formation cycle is complete after receiving a wrapping end signal from the wrapping system corresponding to the bale being fully wrapped, which indicates that the bale formation cycle is complete and the fully formed and wrapped bale is ready for ejection. When the baler controller 210 determines that the bale formation cycle is complete and enters the ejection mode, the baler controller 210 is allowed to output the open signal to the tailgate actuator 230 after, for example, receiving the tailgate open request signal and cause the tailgate actuator 230 to activate and move the tailgate 21 to the open position. In embodiments where the baler controller 210 and the tractor controller 220 are part of an ISOBUS network, the ISOBUS network can output the open signal to the tailgate actuator 230 to move the tailgate 21 to the open position.

Referring now to FIG. 4, the baling system 200 is illustrated when the baler controller 210 is in the lockout mode. While in the lockout mode, the baler controller 210 may prevent outputting the open signal to the tailgate actuator 230, preventing the tailgate actuator 230 from moving the tailgate 21 to the open position. Alternatively, the tailgate actuator 230 may be supplied with pressurized fluid from a hydraulic motor 430, which may be carried by the tractor 100. In some embodiments, the baler controller 210 (and/or the tractor controller 220) is configured to prevent outputting a supply signal to the hydraulic motor 430 in the lockout mode so the hydraulic motor 430 does not provide pressurized fluid to the tailgate actuator 230, which also serves to prevent the tailgate actuator 230 from moving the tailgate 21 to the open position. When the baler controller 210 enters the ejection mode, the baler controller 210 can output the supply signal to the hydraulic motor 430 to supply pressurized fluid to the tailgate actuator 230 and move the tailgate 21 to the open position. Thus, it should be appreciated that the baler controller 210, tractor controller 220, and/or ISOBUS network may prevent or allow the tailgate actuator 230 moving the tailgate 21 to the open position in many different ways.

Figure 5:
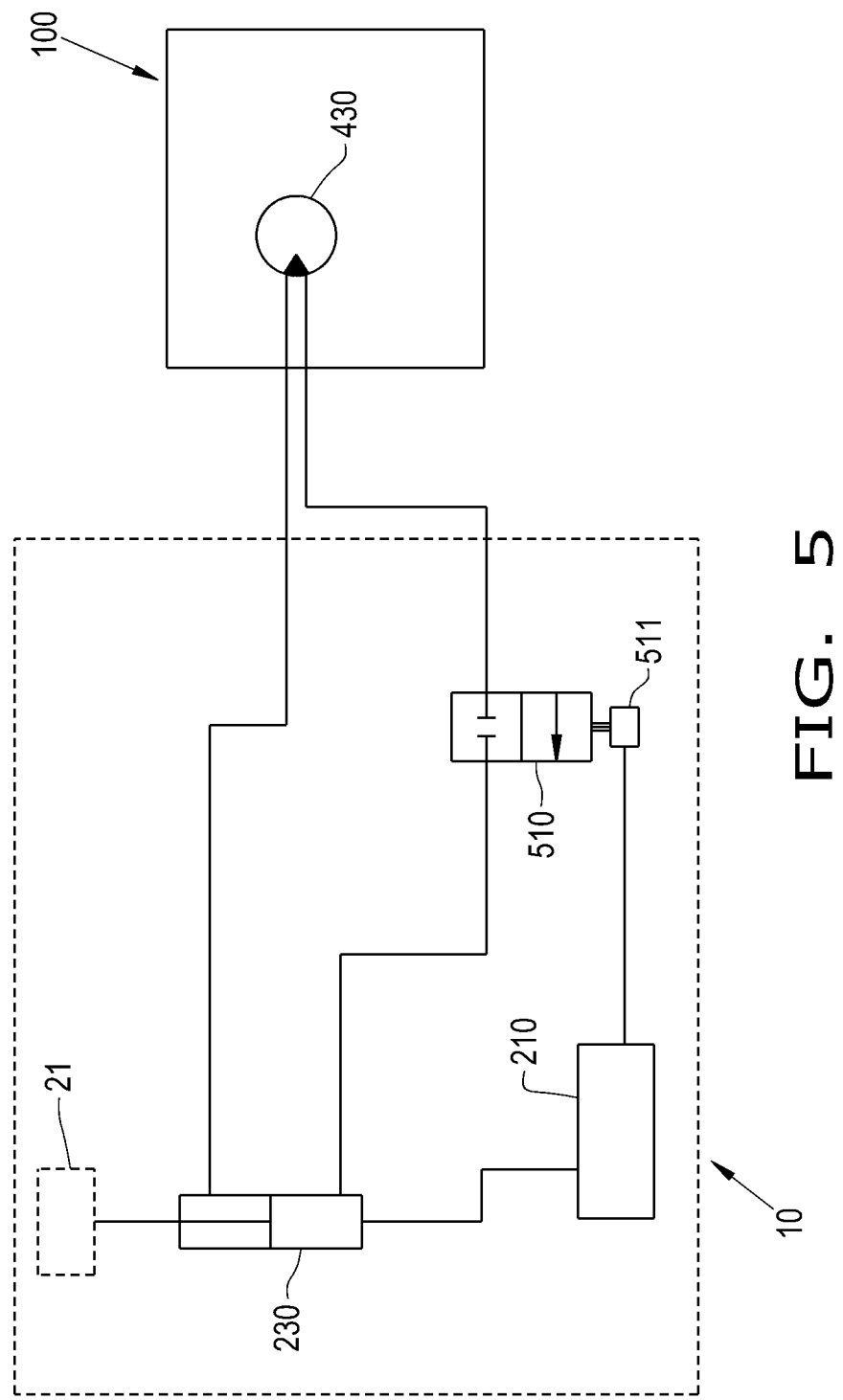
FIG. 5 illustrates a schematic of the baler and tractor of FIG. 2 with an optional valve for controlling fluid flow to a tailgate actuator that is closed, provided in accordance with the present disclosure.
Figure 6:
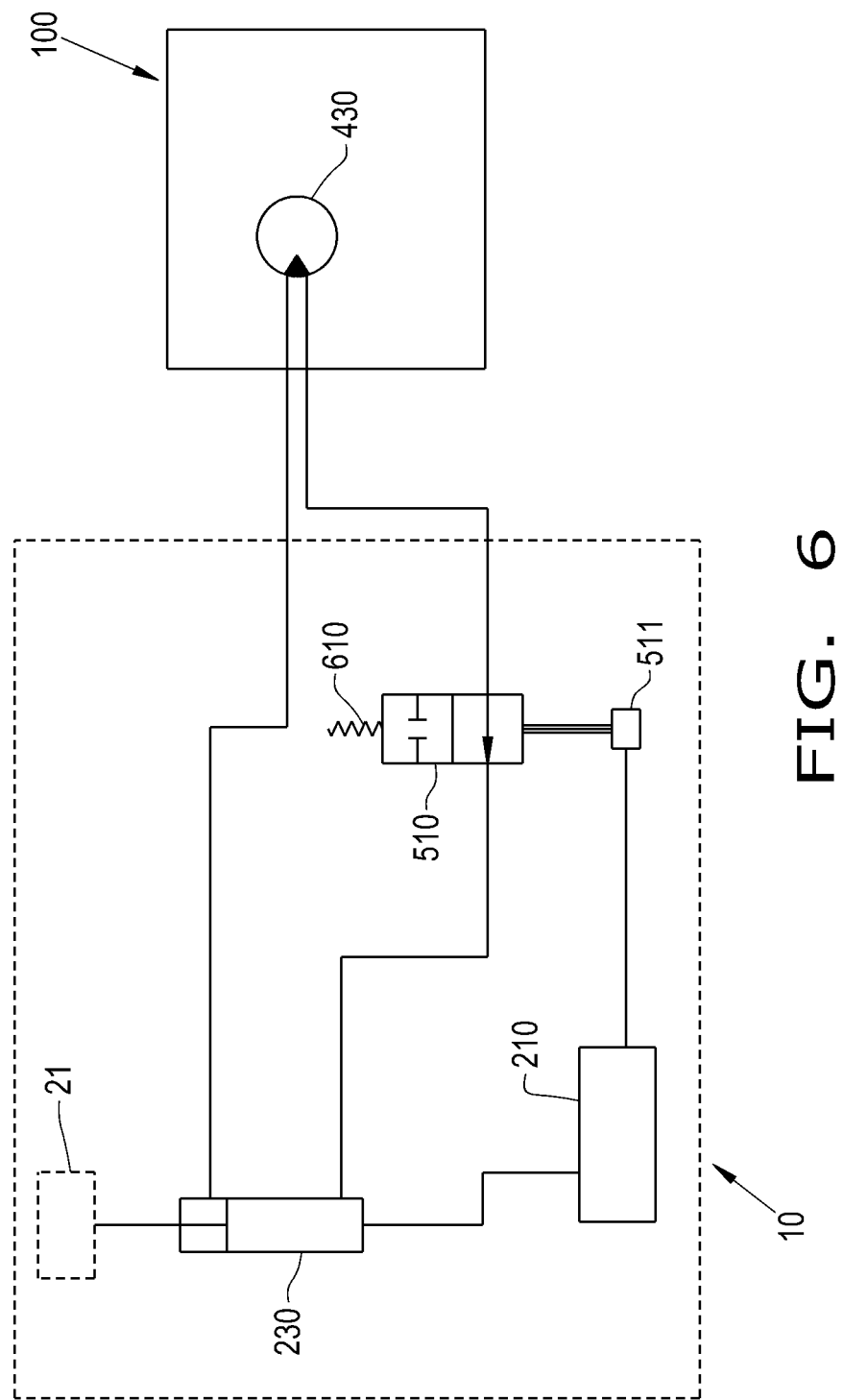
FIG. 6 illustrates the baler and tractor of FIG. 5 with the valve open.

In some embodiments, and referring now to FIGS. 5 and 6, the baler 10 includes a valve 510 that is operatively coupled to the tailgate actuator 230 and the baler controller 210. The valve 510 is disposed in a fluid connection between the tailgate actuator 230, which may be a fluid actuator such as a hydraulic cylinder, and the hydraulic motor 430 and is switchable between being open and closed. The valve 510 may include a solenoid 511 that is operatively coupled to the baler controller 210, either directly or indirectly, to control the solenoid 511 to open and close the valve 510. When the valve 510 is closed, as illustrated in FIG. 5, pressurized fluid from the hydraulic motor 430 cannot flow to the tailgate actuator 230, which prevents the tailgate actuator 230 from moving the tailgate 21 to the open position. In some embodiments, the valve 510 is carried by the tractor 100 rather than the baler 10.

When the baler controller 210 outputs an open signal to the solenoid 511 to switch the valve 510 to be open, as illustrated in FIG. 6, the fluid connection between the hydraulic motor 430 and the tailgate actuator 210 is established, allowing for pressurized fluid from the hydraulic motor 430 to reach the tailgate actuator 210 and move the tailgate 21 to the open position. The baler controller 210 can also output a close signal to the solenoid 511 to close the valve 510. The baler controller 210 may be configured to output the close signal to the solenoid 511 to close the valve 510 when the baler controller 210 enters the lockout mode, preventing pressurized fluid delivery to the tailgate actuator 230 from the hydraulic motor 430. The baler controller 210 may also be configured to output the open signal to the solenoid 511 to open the valve 510 when the baler controller 210 enters the ejection mode, allowing pressurized fluid delivery to the tailgate actuator 230 from the hydraulic motor 430 to move the tailgate 21 to the open position. In some embodiments, a biaser 610, illustrated as a spring in FIG. 6, may be provided that biases the valve 510 closed; in such a configuration, the baler controller 210 can output an open signal to the solenoid 511 so the solenoid 511 forces the valve 510 open when entering the ejection mode and keeps the valve 510 open while in the ejection mode. It should thus be appreciated that the baler controller 210 can also prevent opening of the tailgate 21 when in the lockout mode by controlling various elements to physically block opening of the tailgate 21, alternatively or in addition to the software implemented prevention that is described previously.

Figure 7:
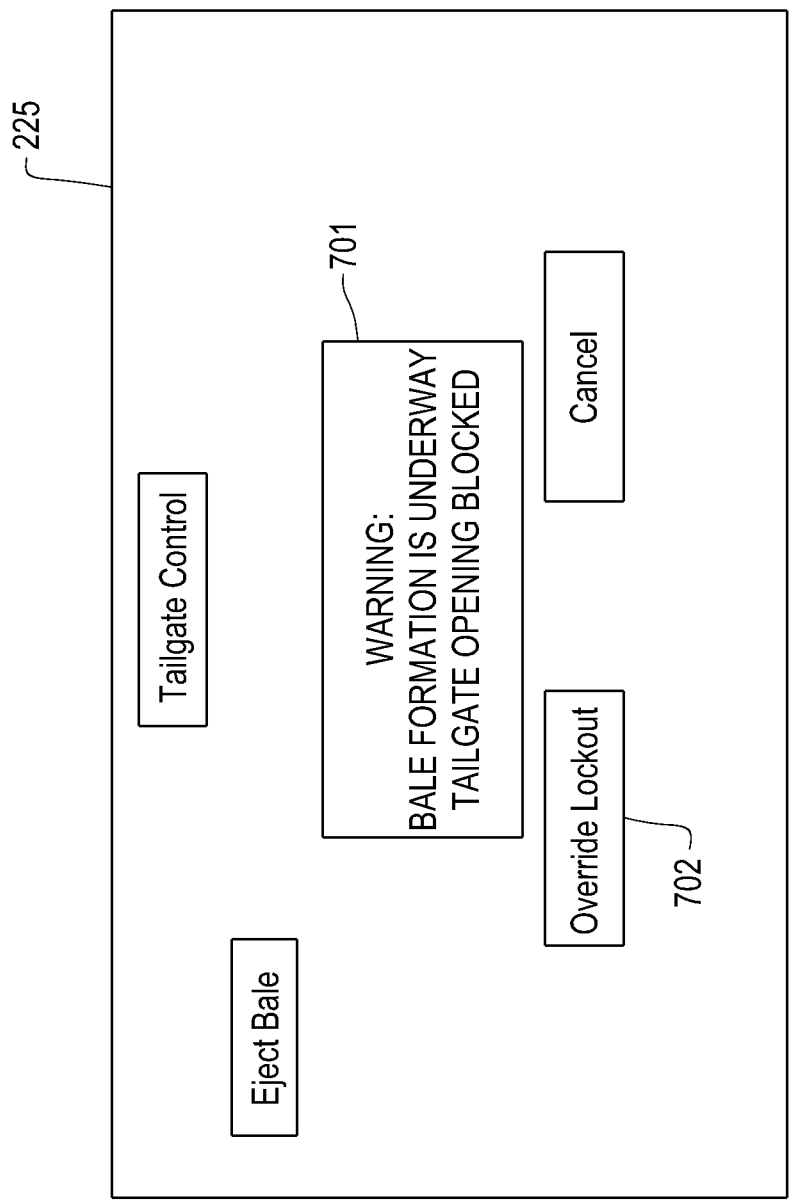
FIG. 7 illustrates an exemplary embodiment of a graphical user interface presented on a display for overriding the controller in the lockout mode.

In some embodiments, and referring now to FIG. 7, the baler controller 210 is configured to output an output blocked signal to the display 225 when receiving the tailgate open request signal while in the lockout mode. The output blocked signal can cause the display 225 to present a blocked opening icon 701 that alerts the operator to the fact that the tailgate 21 is not being opened because the bale formation cycle is underway. In some embodiments, the blocked opening icon 701 presents an override icon 702 that allows an operator to override the lockout mode and switch the baler controller 210 to the ejection mode, allowing the baler controller 210 to, for example, output the open signal to the tailgate actuator 230 after receiving the tailgate open request signal. Overriding the lockout mode may require, for example, the operator to confirm the override in a separate sub-menu, with or without a verification code, to reduce the risk of the operator inadvertently overriding the lockout mode to allow ejection of the bale. After the operator signals for the lockout override, the display 225 outputs a lockout bypass signal to the baler controller 210 that causes the baler controller 210 to enter the ejection mode from the lockout mode, allowing the baler controller 210 to output the open signal to the tailgate actuator 230.

From the foregoing, it should be appreciated that the baler 10 provided according to the present disclosure can reduce the risk of an operator inadvertently releasing a bale that is not fully formed from the baler 10. The baler controller 210, tractor controller 220, and/or ISOBUS network can, for example, have a software-implemented lockout mode that prevents outputting of the open signal to the tailgate actuator 230, preventing opening of the tailgate 21. The lockout mode can be automatically engaged when the controller 210, 220 senses that a bale is forming in the baling chamber. The controller 210, 220 can automatically enter the ejection mode from the lockout mode when the bale is fully formed and/or wrapped, as previously described. Thus, the controller 210, 220 not only reduces the risk of a bale being inadvertently ejected due to an operator accidentally hitting a switch or button, but also reduces the risk of a bale being ejected due to an operator mistakenly believing that the bale formation cycle has completed.

Figure 8:
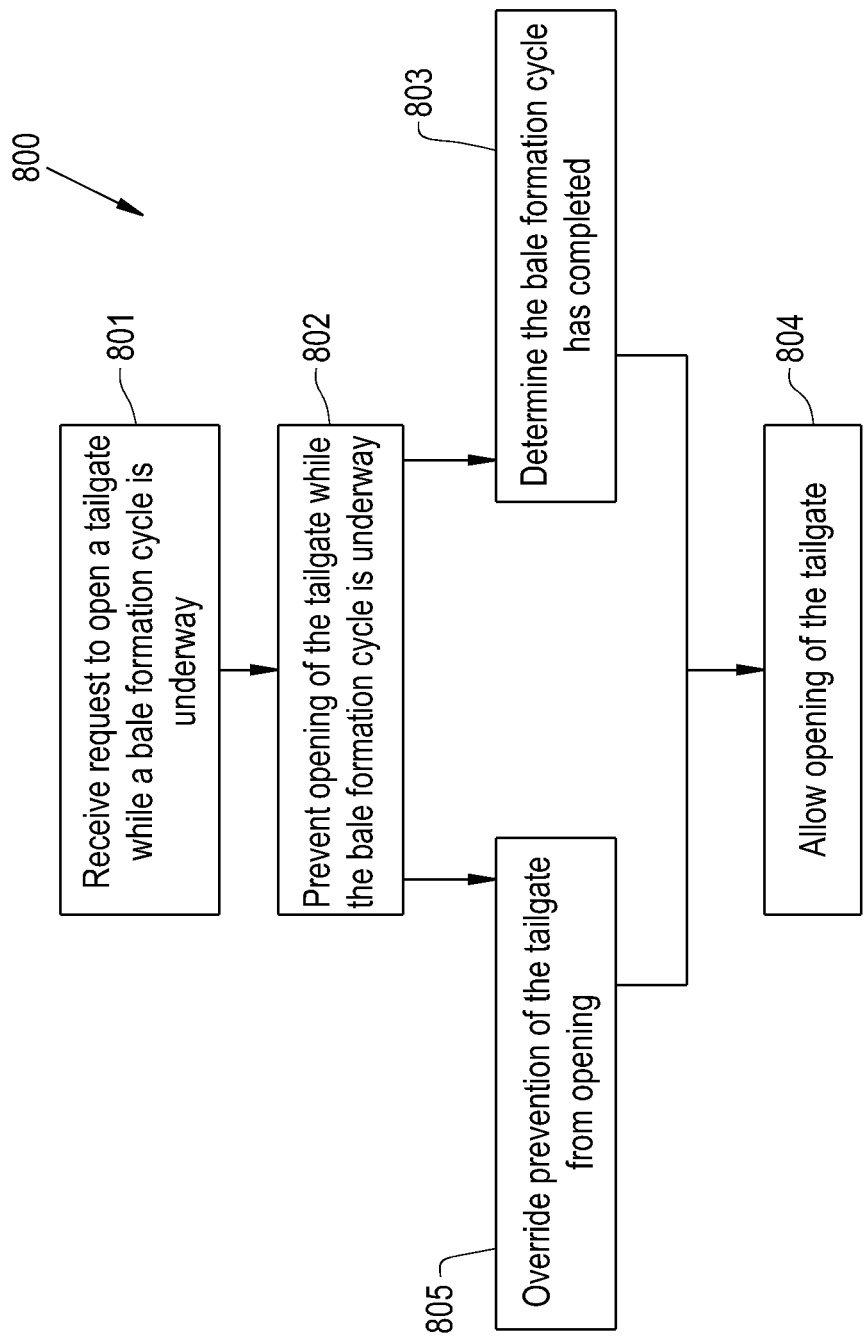
FIG. 8 illustrates an exemplary embodiment of a method of controlling a tailgate assembly of an agricultural baler, provided in accordance with the present disclosure.

Referring now to FIG. 8, an exemplary embodiment of a method 800 of controlling a tailgate assembly 120 of an agricultural baler 10 provided according to the present disclosure is illustrated. The method 800 is performed by a controller, such as a baler controller 210, a tractor controller 220, and/or an ISOBUS network, and includes receiving 801 a request to open a tailgate 21 while a bale formation cycle is underway in a bale forming chamber of the baler 10. The controller 210, 220 may know that a bale formation cycle is underway, for example, by initiating the start of a bale formation cycle and/or by receiving signals, such as from one or more bale size sensor(s) 110, that indicate a bale is forming in the bale forming chamber. The controller 210, 220 prevents 802 opening of the tailgate 21 while the bale formation cycle is underway. The controller 210, 220 may prevent 802 opening of the tailgate 21 in a variety of ways, as previously described. The controller 210, 220 determines 803 that the bale formation cycle is completed and allows 804 opening of the tailgate 21 after determining 803 that the bale formation cycle is completed. The controller 210, 220 may determine that the bale formation cycle is complete based at least partially on signals from the bale size sensor(s) 110 corresponding to a predetermined size of the forming bale, as previously described. In some embodiments, the method 800 further includes overriding 805 preventing 802 of the tailgate 21 from opening when, for example, an operator overrides a lockout mode of the controller 210, 220 to enter an ejection mode that allows opening of the tailgate 21, as previously described. It should thus be appreciated that the method 800 provided according to the present disclosure reduces the risk of an operator inadvertently releasing a bale before it is fully formed and/or wrapped.

It is to be understood that the steps of the method 800 are performed by the controller 210, 220 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 210, 220 described herein, such as the method 800, is implemented in software code or instructions which are tangibly stored on a tangible computer readable medium. The controller 210, 220 loads the software code or instructions via a direct interface with the computer readable medium or via a wired and/or wireless network. Upon loading and executing such software code or instructions by the controller 210, 220, the controller 210, 220 may perform any of the functionality of the controller 210, 220 described herein, including any steps of the method 800 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A tailgate assembly for an agricultural baler, comprising:
   a tailgate configured to move between an open position and a closed position to open and close a round bale forming chamber;
   a tailgate actuator coupled to the tailgate and configured to move the tailgate between the open position and the closed position;
   a controller configured to:
      determine that a bale formation cycle is beginning;
      enter a lockout mode responsively to determining the bale formation cycle has begun, the lockout mode preventing the tailgate actuator from moving the tailgate to the open position;
      determine that the bale formation cycle is complete; and
      enter an ejection mode from the lockout mode responsively to determining the bale formation cycle has completed, the ejection mode allowing the tailgate actuator to move the tailgate to the open position; and
      said tailgate assembly further comprising a valve that is operatively coupled to the tailgate actuator and the controller and is switchable between being open and closed, the tailgate actuator being a fluid actuator and the valve preventing fluid delivery to the tailgate actuator when closed and allowing fluid delivery to the tailgate actuator when open, wherein the valve comprises a solenoid and the controller is configured to output a close signal to the solenoid to close the valve when entering the lockout mode and output an open signal to the solenoid to open the valve when entering the ejection mode.

2. The tailgate assembly of claim 1, wherein the controller is operatively coupled to the tailgate actuator and prevented from outputting an open signal to the tailgate actuator when in the lockout mode, the open signal causing the tailgate actuator to move the tailgate to the open position, and allowed to output the open signal to the tailgate actuator when in the ejection mode.

3. The tailgate assembly of claim 2, wherein the controller is configured to output the open signal to the tailgate actuator responsively to receiving a tailgate open request signal in the ejection mode.

4. The tailgate assembly of claim 3, wherein the controller is configured to output an output blocked signal to a display responsively to receiving the open request signal when in the lockout mode.

5. The tailgate assembly of claim 1, wherein the solenoid operatively coupled to the controller and a biaser that biases the valve closed, the controller being configured to output an open signal to the solenoid to open the valve when entering the ejection mode and keep the valve open while in the ejection mode.

6. The tailgate assembly of claim 1, wherein the controller is configured to receive a bale size signal indicating a current size of a forming bale and switch from the lockout mode to the ejection mode when the current size of the forming bale reaches a predetermined size.

7. An agricultural baler, comprising:
   a chassis;
   a round bale forming chamber carried by the chassis; and
   a tailgate assembly associated with the round bale forming chamber, the tailgate assembly comprising:
      a tailgate that is movable between an open position and a closed position;
      a tailgate actuator coupled to the tailgate and configured to move the tailgate between the open position and the closed position;
      a controller configured to:
         determine that a bale formation cycle is beginning;
         enter a lockout mode responsively to determining the bale formation cycle has begun, the lockout mode preventing the tailgate actuator from moving the tailgate to the open position;
         determine that the bale formation cycle is complete; and
         enter an ejection mode from the lockout mode responsively to determining the bale formation cycle has completed, the ejection mode allowing the tailgate actuator to move the tailgate to the open position; and
         said agricultural baler further comprising a valve that is operatively coupled to the tailgate actuator and the controller and is switchable between being open and closed, the tailgate actuator being a fluid actuator and the valve preventing fluid delivery to the tailgate actuator when closed and allowing fluid delivery to the tailgate actuator when open, wherein the valve comprises a solenoid and the controller is configured to output a close signal to the solenoid to close the valve when entering the lockout mode and output an open signal to the solenoid to open the valve when entering the ejection mode.

8. The agricultural baler of claim 7, wherein the controller is operatively coupled to the tailgate actuator and prevented from outputting an open signal to the tailgate actuator when in the lockout mode, the open signal causing the tailgate actuator to move the tailgate to the open position, and allowed to output the open signal to the tailgate actuator when in the ejection mode.

9. The agricultural baler of claim 8, wherein the controller is configured to output the open signal to the tailgate actuator responsively to receiving a tailgate open request signal in the ejection mode.

10. The agricultural baler of claim 9, further comprising a display operatively coupled to the controller, the controller being configured to output an output blocked signal to the display responsively to receiving the open request signal when in the lockout mode.

11. The agricultural baler of claim 10, wherein the display is configured to output a lockout bypass signal to the controller that causes the controller to enter the ejection mode from the lockout mode.

12. The agricultural baler of claim 7, wherein the solenoid operatively coupled to the controller and a biaser that biases the valve closed, the controller being configured to output an open signal to the solenoid to open the valve when entering the ejection mode and keep the valve open while in the ejection mode.

13. The agricultural baler of claim 7, further comprising a bale size sensor disposed in the bale forming chamber and operatively coupled to the controller, the bale size sensor being configured to output a bale size signal to the controller that is indicative of a current size of a forming bale, the controller being configured to switch from the lockout mode to the ejection mode when the current size of the forming bale reaches a predetermined size.

14. The agricultural baler of claim 7, further comprising a wrapping system carried by the chassis and configured to wrap a fully formed bale in wrapping material, the wrapping system being operatively coupled to the controller and configured to output a wrapping end signal to the controller when the fully formed bale is wrapped, the wrapping end signal being indicative of the bale formation cycle being complete.

\* \* \* \* \*